United States Patent
Hay et al.

[11] Patent Number: 6,015,232
[45] Date of Patent: Jan. 18, 2000

[54] CONSTANT VELOCITY TEMPERATURE PROBE IN A PRODUCT FLOW LINE

[75] Inventors: Lloyd F. Hay, Oakdale; Thomas L. Dambak, Acampo, both of Calif.

[73] Assignee: FMC Corporation, Chicago, Ill.

[21] Appl. No.: 09/099,995

[22] Filed: Jun. 19, 1998

[51] Int. Cl.[7] .......................... G01K 13/02; G01K 7/04; G01K 7/16; G01K 5/02; G01K 5/62

[52] U.S. Cl. .................. 374/138; 374/148; 374/179; 374/183; 374/190; 374/194; 374/205

[58] Field of Search ..................... 374/208, 138, 374/148, 141, 179, 183, 205, 190, 194

[56] References Cited

U.S. PATENT DOCUMENTS

| | | | |
|---|---|---|---|
| 2,697,554 | 12/1954 | Kendig | 236/79 |
| 2,967,429 | 1/1961 | Taylor | 374/147 |
| 3,559,486 | 2/1971 | Gormar | 374/148 |
| 3,589,192 | 6/1971 | Sabovik | 136/230 |
| 3,616,272 | 10/1971 | Goerg et al. | 205/787.5 |
| 4,121,763 | 10/1978 | Roberge | 236/87 |
| 4,630,939 | 12/1986 | Mayes | 374/135 |
| 4,638,668 | 1/1987 | Leverberg et al. | 73/866.5 |
| 5,116,137 | 5/1992 | Xiong et al. | 374/132 |
| 5,302,026 | 4/1994 | Phillips | 374/135 |
| 5,632,557 | 5/1997 | Simons | 374/148 |

FOREIGN PATENT DOCUMENTS

| | | | |
|---|---|---|---|
| 413198 A1 | 2/1991 | European Pat. Off. | 374/141 |
| 4101549 A1 | 7/1992 | Germany | 374/138 |
| 1737284 A1 | 5/1992 | U.S.S.R. | 374/138 |

*Primary Examiner*—Diego Gutierrez
*Assistant Examiner*—Stanley J. Pruchnic, Jr.
*Attorney, Agent, or Firm*—Wood, Herron & Evans, L.L.P.

[57] ABSTRACT

A temperature probe for use in a product flow line including a valve seat secured in the flow line, a valve stem and an orifice ring. The orifice ring is attached to the valve stem to define a pair of flow paths for product passing through the product flow line. One flow path is through the ring and the other is between the ring and the valve seat. A temperature sensing probe is carried by the valve stem and positioned in the orifice ring for sensing the temperature of the product in the flow line. A spring is connected to act on the valve stem and is responsive to changes in velocity of the product in the flow line to move the orifice ring toward and away from the valve seat to maintain the velocity of the product flowing past the probe constant.

17 Claims, 1 Drawing Sheet

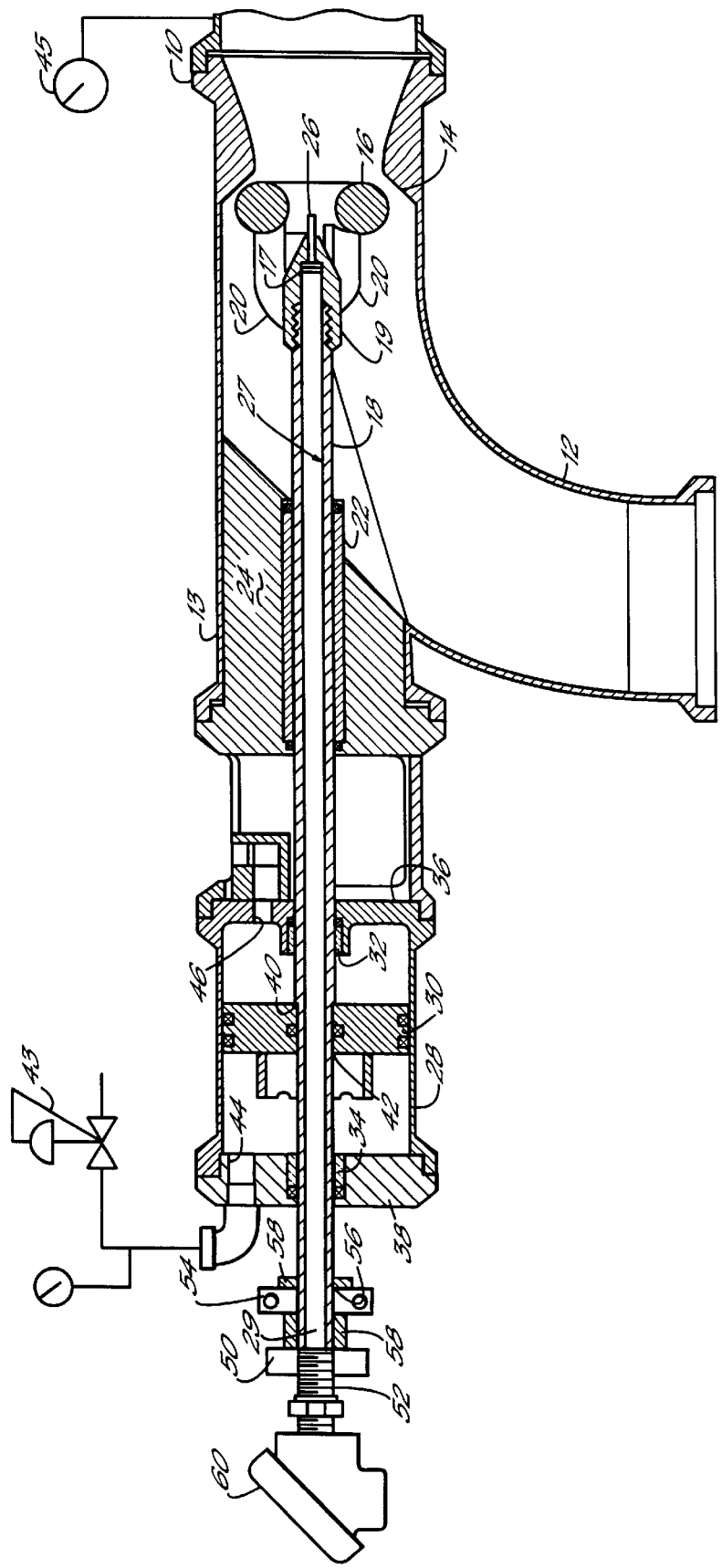

CONSTANT VELOCITY TEMPERATURE PROBE IN A PRODUCT FLOW LINE

This invention relates to temperature probes, generally, and more particularly to such probes which are useable in sensing the temperature of flowable products.

The process control systems employed in the processing of flowable food products, such as tomato paste and salad dressings, for example, require the input of data regarding the product's temperature. Such temperature data must not only be accurate but also provided continuously. It has been common practice to position any one of a variety of temperature probes where it projects into the product sensed, with the most efficient position being in a flow line carrying the product so that the flow of the product past the probe provides the most current temperature data for use by the process control system. Such an arrangement will provide a continuous stream of temperature data, but accuracy becomes a problem when the product has a high viscosity and a tendency to coagulate causing the product to adhere to and build up, i.e., accumulate, on the probe. Such build up creates a static boundary layer which acts as insulation decreasing the sensitivity of the probe. As a consequence, the process control system receives temperature data that is not accurate. While the mere velocity of the product flowing past the probe will discourage such build up, the process control system itself may create variations in the product flow resulting in inconsistent velocities across the temperature probe. Since some food products, such as tomato paste, for example, exhibit properties which are thixotropic in nature, i.e., their viscosity increases as the velocity of their flow decreases, it is desirable to maintain a constant velocity past the temperature probe even though the process control system creates variations in the flow rate through the system. It is even possible under extreme conditions for the combined effects of build up and the variations in the system flow rate to result in temperature data that is so inaccurate that it causes the control system to lose control of the process itself The present invention provides a temperature probe mounted in the center of a streamlined orifice ring which is movable toward and away from a valve seat to define a predetermined, fixed-area path for product flow through the center of the orifice ring and a variable-area path between the orifice ring and the valve seat, with flow being blocked from the latter path when the orifice ring is in engagement with the valve seat. A spring is operatively connected to the orifice ring to urge the orifice ring toward the valve seat. The position of the orifice ring is determined by the opposing force of the velocity head created by impingement of the product flow against the orifice ring and the frontal area of the temperature probe. Thus, as the velocity head increases as a result of an increase in the flow of product through the system, the orifice ring will move away from the valve seat. The increased area of the variable path permits greater flow of product therethrough so that the velocity of product through the fixed-area path remains substantially unchanged. Conversely, as the velocity head decreases as a result of a decrease in the flow of product through the system, the orifice ring will move toward the valve seat decreasing the area of the variable path and assuring a greater percent of the system flow is through the orifice ring in order to maintain the velocity of product flow past the temperature probe substantially constant. Thus, the velocity of product flow through the orifice ring and past the temperature probe will remain substantially constant even though velocity of product flow through the system varies.

The objects of the present invention are to provide a temperature probe which solves the problems encountered with, and shortcomings of, prior art probes; which provides an accurate indication of the temperature through a wide range of variations in product flow through the system even when sensing viscous or thixotropic products; which effectively precludes the build up of product thereon; which maintains an optimum velocity of product flow across the probe throughout a wide range of system flows; which may be readily retrofitted into existing systems; and which is reliable and easy to maintain. These and other objects of the present invention, and many of the attributes thereof, will become more readily apparent from a perusal of the following detailed description and the accompanying drawings, wherein the sole figure is a vertical cross section of a product flow line incorporating a temperature probe according to the present invention.

Referring to the drawing, a portion of a product flow line is shown including a straight section 10 and a ninety degree elbow 12, sealingly clamped to each other by means of connectors, which for clarity have not been shown, but are standard connectors such as those sold by Cherry-Burrrell, for example, that engage and squeeze the adjacent angled protrusions, with the flow of product therethrough being from the section 10 into the elbow 12. A valve seat 14 is formed on the upstream end of the elbow 12. An orifice ring 16 is attached to three equi-angularly spaced support arms, two of which are shown at 20, which arms are attached to a streamlined, cylindrical body 19. The body 19 is threadedly secured at one end to a hollow valve stem 18 and has an opening at is forward end. The valve stem 18 extends through and is slideable in a bushing 22 pressed into a bore formed in an insert 24 sealingly clamped by a means of a standard connector to an extension 13 formed on the elbow 12. A temperature sensing probe 27, which preferably is a resistance thermal detector (RTD), but may also be a thermistor, a bimetallic thermometer, a thermocouple or a mercury thermometer, has a temperature sensitive tip 26 formed in situ with a larger diameter sheath 29. The probe 27 is positioned inside the hollow valve stem 18 with the tip 26 centered on the orifice ring and the end of the tip positioned at the minimum interior diameter of the ring 16. The probe 27 is releasably locked in this position by a clamp arrangement, which includes a circular plate 50 threaded onto a fitting 52 secured to the outer end of the sheath 29 and a split clamp 54 engaging an exterior groove 56 formed on the valve stem 18. The plate 50 is releasably secured to the split clamp 54 by bolts 58 extending through openings in the clamp 50 to engage tapped holes in the plate 50. An O-ring seal 17, set in an exterior groove of the sheath 29 engages the body 19 to prevent product leakage into the space between the sheath 29 and the valve stem 18. An air cylinder 28, having an inner end 36 and an outer end 38, has a piston 30 reciprocable therein. The hollow valve stem 18 extends through bushings 32 and 34 pressed into the inner and outer ends 36 and 38 respectively of the cylinder 28. The valve stem 18 also extends through the piston 30, with the piston 30 affixed thereto by being trapped between a shoulder 40 formed on the valve stem and a snap ring 42. Air under pressure is introduced from a hand-controlled, pressure regulator valve 43 to the outer end of the cylinder 28 through a port 44 provided in the end 34 of the cylinder 28. The other side of the piston 30 is vented to atmosphere by a vent port 46 provided in the inner end 36 of the cylinder 28. The leads from the temperature sensitive tip 26 extend through the interior of the sheath 29 to the weatherhead 60 wherein connection in a conventional manner may be made to an appropriate display and/or control means in the process control system.

The product flowing from the straight section 10 has two possible paths, one between the valve seat 14 and orifice ring 16 and the other between the orifice ring 16 and tip 26 of the temperature probe 27. The force created by the flow of the product impinging on the frontal area of the tip 26, the end of the body 19 and the orifice ring 16, i.e., the velocity head, will act to move the valve stem 18 and the attached piston 30 toward the left, as viewed in the drawing. Air pressure acting on the outer end of the piston 28 will urge the piston and the attached valve stem in the opposite direction. As the flow in the straight section 10 decreases, the velocity head will decrease. The air pressure acting on the piston 30 will now be greater than the velocity head causing the piston and the attached valve stem 18 to move to the right. The orifice ring 16 will approach the valve seat 14 decreasing the area available for flow between the valve seat 14 and the orifice ring 16 permitting the velocity of product flowing between the orifice ring 14 and the tip 26, which would otherwise decrease, to remain constant or substantially constant. As the flow in the straight section 10 increases, the velocity head will increase, causing the piston and the attached valve stem 18 to move to the left. As a result, the orifice ring 16 will move away from the valve seat 14 increasing the area between the orifice ring 16 and the valve seat 14 and permitting the velocity of the product flowing past the tip 26, which would otherwise increase, to remain constant or substantially constant. Thus, the velocity of the product flowing past the tip 26 is uniformly maintained at the desired optimum velocity.

In the engineering of a particular application, the minimum expected flow through the system is determined based upon ideal design parameters and product characteristics. The orifice is then designed so the orifice ring 16, even at the minimum expected flow, will be lifted from engagement with the valve seat 14. The system is then initially operated under steady state conditions, i.e., with no variation in flow, at a flow rate at or near the minimum expected and with no pressure being introduced by the pressure regulator valve 43 until an equilibrium state in the system is attained, which can be determined by observing a steady pressure at a given point within the system, such as indicated by pressure gage 45. The pressure regulator valve 43 is then gradually opened to increase the air pressure behind the piston 30. When the system pressure begins to increase, as indicated by the system pressure gauge 45, the operator knows the increased system pressure is caused by the orifice ring 16 approaching the seat 14, and the value of the air pressure causing the slight increase in system pressure will be the proper air pressure for operation of the system. That is, the air pressure acting on the piston 39 is creating a force sufficient to just counteract the velocity head created by impingement of product on the orifice ring and the temperature probe at the minimum flow rate. Under these conditions, the orifice ring 16 will be spaced from the seat 14 creating the aforementioned two paths. As system flow increases from this minimum, the resulting higher velocity head will cause the orifice ring 16 to move away from the seat 14 permitting a greater percentage of product flow to pass between the orifice ring 16 and the seat 14. The velocity of the product through the orifice ring 16 and past the probe 27 will, therefore, remain substantially constant. Should the system flow rate subsequently fall below the expected minimum, the orifice ring will move, under the force of the air pressure acting on the piston 30, toward the seat 14 to maintain the velocity of product flow through the orifice ring 16 and past the probe 27. Once the proper air pressure has been determined on initial start-up for a particular product, the regulator valve 43 can subsequently be adjusted to that air pressure at the start of system operations.

The air pressure acting on the piston 30 is in essence an air spring, and is the preferred method of providing a force, because it is a constant force, to oppose the velocity head created by flow of the product. However, some products may permit the use of a compression spring trapped between the outer end 38 of the cylinder 28 and the piston 30. The force created by the spring will not be constant, but will be a function of the distance it is compressed from its relaxed state. In some cases, such as where the total stroke required is small, this variation in force will provide acceptable performance. When such a spring arrangement is used, the variation in force required for different products may be achieved by substituting compression springs with different spring constants and/or by variation of their relaxed lengths, the latter varying the pre-load on the compression spring. An extension spring may be used in lieu of a compression spring, with the extension spring having one of its ends attached to the inner end 36 of the cylinder 28 and the other of its ends attached to the piston 30.

While a preferred embodiment of the present invention has been illustrated and described herein, it is to be understood that various changes may be made therein without departing from the spirit of the invention as defined by the scope of the appended claims.

What is claimed is:

1. A product flow system comprising:
    a product flow line;
    a valve seat secured in said line;
    a valve stem;
    an orifice ring attached to said valve stem for defining a pair of flow paths for product passing through said product flow line, one of said flow paths being through said ring and the other of said flow paths being between said ring and said valve seat;
    a temperature sensing probe carried by said valve stem and positioned in said orifice ring for sensing the temperature of the product in said line; and
    a spring connected to act on said valve stem and responsive to changes in velocity of the product in said flow line to move said orifice ring toward and away from said valve seat to maintain the velocity of the product flowing past said probe substantially constant.

2. The system according to claim 1, wherein said spring comprises an air spring.

3. The system according to claim 1, wherein said spring comprises a compression spring.

4. The system according to claim 1, wherein said spring comprises an extension spring.

5. A product flow system comprising:
    a product flow line;
    a valve seat secured in said line;
    a valve stem;
    an orifice ring attached to said valve stem for defining a pair of flow paths for product passing through said product flow line, one of said flow paths being through said ring and the other of said flow paths being between said ring and said valve seat;
    a temperature sensing probe carried by said valve stem and positioned in said orifice ring for sensing the temperature of the product in said line; and
    a spring connected to act on said valve stem for opposing the force imposed on said orifice ring whereby a smaller percent of product is directed through said other path in response to decreased flow in said flow line in order to maintain the flow of product through said one path substantially constant.

6. The system according to claim 5, wherein said temperature sensing probe has a temperature sensitive tip with a forward end, and said tip is positioned on the centerline of said orifice ring with said forward end being positioned at the minimum diameter of said ring.

7. The system according to claim 6, further comprising:

a streamlined body having forward and rearward ends, said forward end including an opening, and said rearward end being connected to said valve stem;

a plurality of support arms connecting said body to said orifice ring; and said temperature sensitive tip projecting from said opening.

8. The system according to claim 7, further comprising;

a clamp for releasably securing said temperature probe to said valve stem.

9. The system according to claim 8, wherein said clamp comprises:

a plate connected to said temperature probe;

a split clamp connected to said valve stem; and fasteners releasably securing said plate to said split clamp.

10. An apparatus for sensing the temperature of a flowable product moving through a product flow line, the apparatus comprising:

a temperature sensing probe adapted to be disposed in the flowable product; and a valve member connected for movement adjacent said temperature sensing probe, said valve member responding to changes in flow velocity of the product moving through the product flow line such that said valve member opens in response to higher flow velocities and closes in response to relatively lower flow velocities thereby maintaining a substantially constant product flow velocity past said temperature sensing probe.

11. The apparatus of claim 10, wherein said valve member is operatively connected to a spring and said valve member opens against a bias provided by said spring.

12. The apparatus of claim 11, wherein said spring comprises an air spring.

13. The apparatus of claim 11, wherein said valve member includes an orifice ring and further comprising a valve seat, said orifice ring and valve seat defining first and second product flow paths when said orifice ring is opened away from said valve seat, said first flow path being a fixed path through said orifice ring and said second flow path being a variable flow path between said orifice ring and said valve seat.

14. The apparatus of claim 13, wherein said temperature sensing probe has a temperature sensitive tip with a forward end, said temperature sensitive tip being coaxially aligned with the centerline of said orifice ring and said forward end being disposed within said orifice ring.

15. The apparatus of claim 10, wherein said temperature sensing probe is selected from the group consisting of resistance thermal detectors, thermistors, bimetallic thermometers, thermocouples and mercury thermometers.

16. The apparatus of claim 15, wherein said temperature sensing probe is a resistance thermal detector.

17. The apparatus of claim 10, wherein said valve member further comprises a movable valve stem connected for movement with said temperature sensitive probe.

* * * * *